Sept. 28, 1943. E. HÜRLIMANN 2,330,586
IMPLEMENT FOR WORKING THE SOIL
Filed April 19, 1941 4 Sheets-Sheet 1
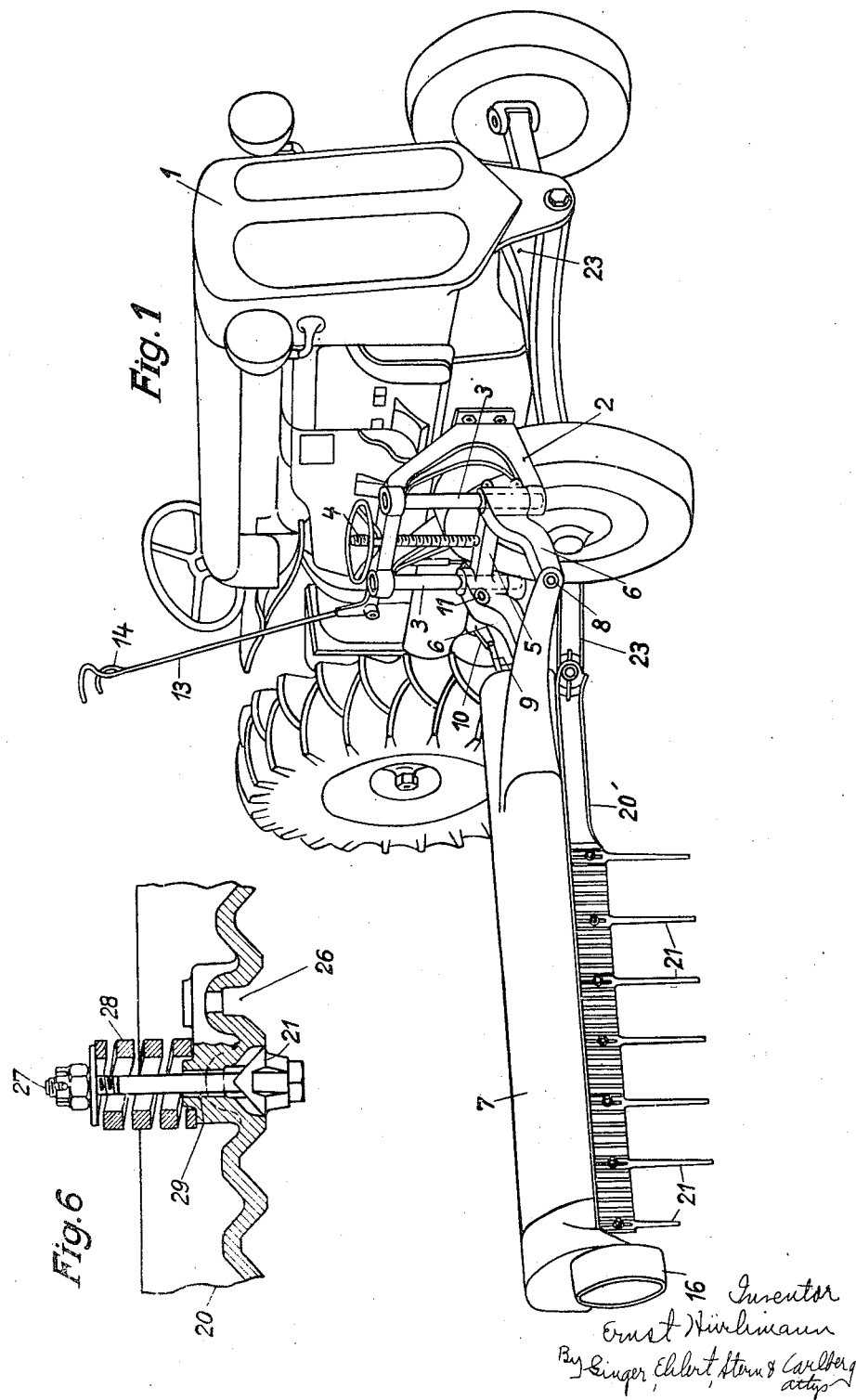
Inventor
Ernst Hürlimann
By Singer, Ehlert, Stern & Carlberg
attys

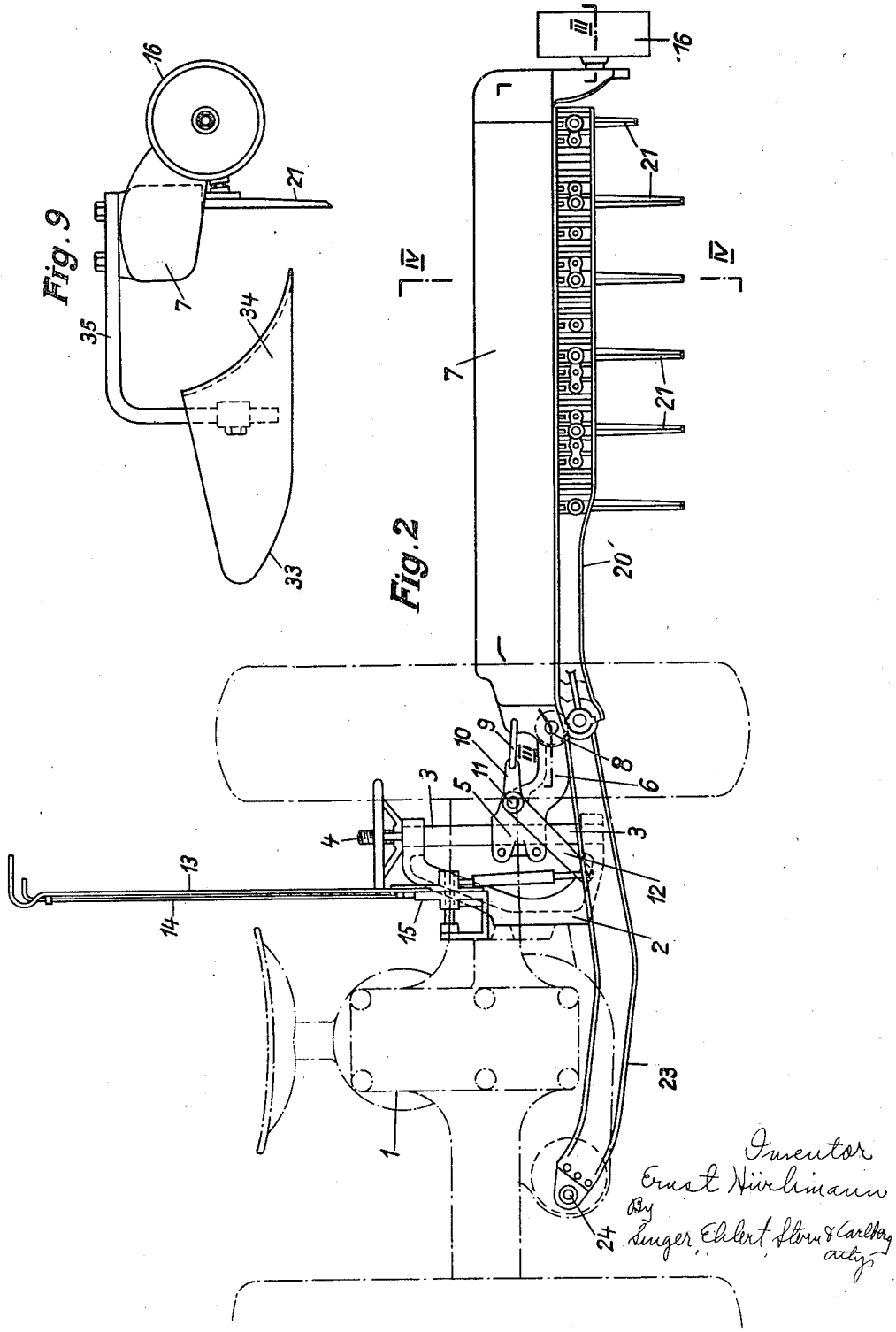

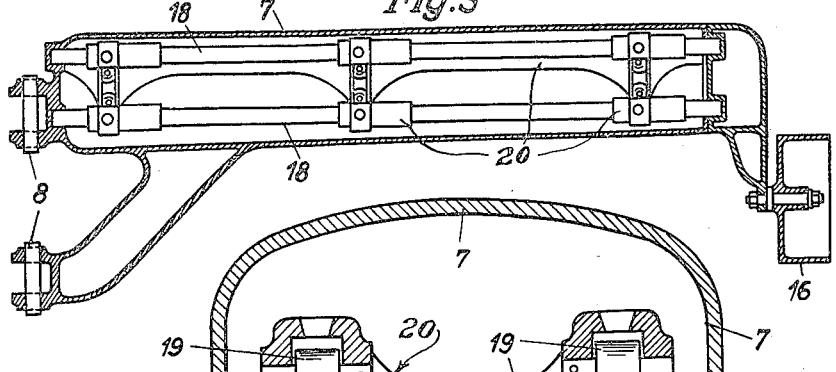
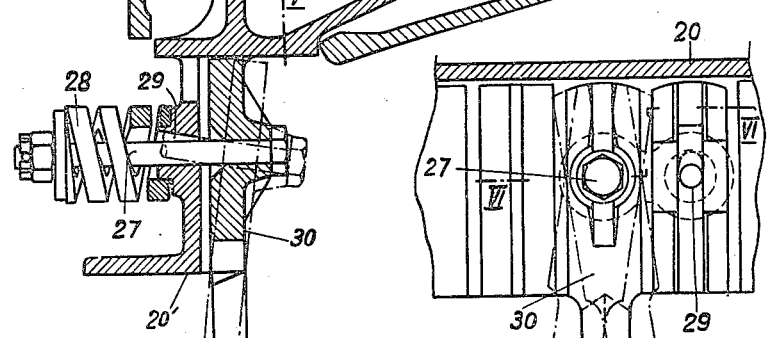
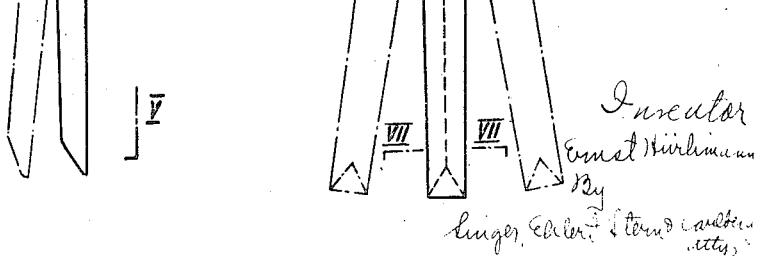

Sept. 28, 1943.  E. HÜRLIMANN  2,330,586
IMPLEMENT FOR WORKING THE SOIL
Filed April 19, 1941   4 Sheets-Sheet 4
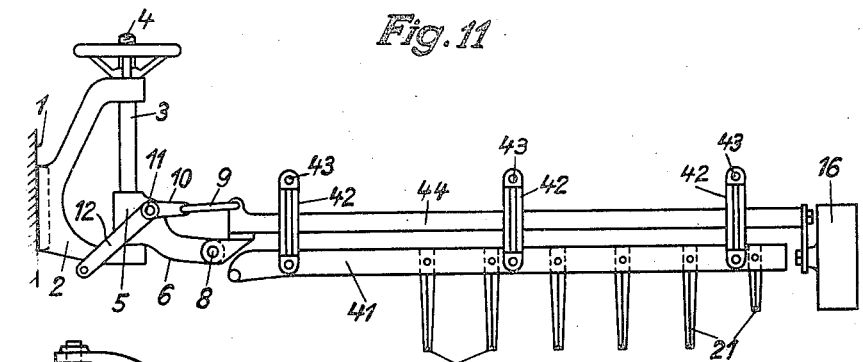
Fig. 11
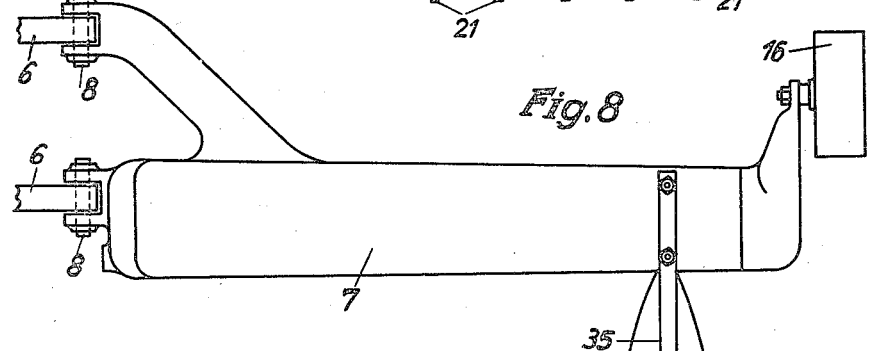
Fig. 8
Fig. 10
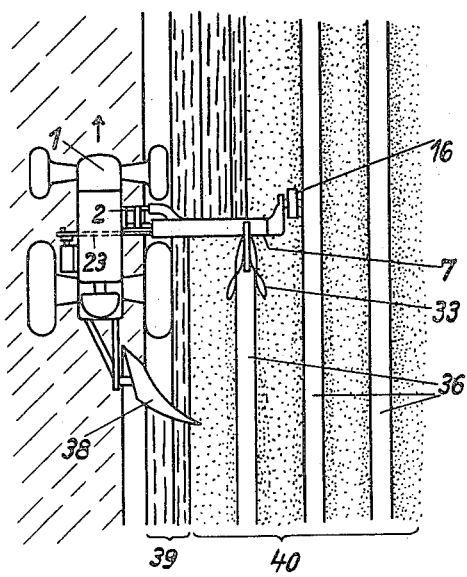
Fig. 7
Inventor
Ernst Hürlimann
By
Singer, Ehlert, Stern & Carlberg
attys.

Patented Sept. 28, 1943

2,330,586

UNITED STATES PATENT OFFICE 2,330,586

IMPLEMENT FOR WORKING THE SOIL

Ernst Hürlimann, Wil, Switzerland, assignor to Johann Hurlimann, Wil, Switzerland Application April 19, 1941, Serial No. 389,451
In Switzerland April 20, 1940

9 Claims. (Cl. 97—44)

The present invention relates to a new and improved implement for working the soil comprising a power driven tractor, a plow and a harrow.

A principal feature of the invention resides in the particular construction of the harrow. The main object of the invention is to provide means to save labor and time in cultivating the land.

With these and other objects in view the invention consists in the improved construction and novel arrangement and combination of parts which will be hereinafter fully described and particularly pointed out in the claims.

The accompanying drawings illustrate a simple and preferred form of the invention, it being, however, understood that the invention is not limited to the precise structural details therein exhibited, but that changes, alterations and modifications within the scope of the claims may be resorted to when desired.

In the drawings:

Fig. 1 is a perspective view of the tractor with the harrow in its operative position.

Fig. 2 is an elevation view of the harrow and illustrates the means to operate same.

Figs. 3, 4, 5, 6 and 7 are sectional views taken on the lines III—III and IV—IV of Fig. 2, V—V of Fig. 4 and VI—VI and VII—VII of Fig. 5 respectively.

Fig. 8 shows in a plan view the harrow having attached thereto shares for planting potatoes.

Fig. 9 shows the attachment in side elevation.

Fig. 10 illustrates in a plan view the working of the device.

Fig. 11 shows in a side elevation a harrow of modified construction.

On an agricultural tractor 1, which may be of any suitable make, a plow 38 of conventional form is attached in the usual manner.

On the side of the frame of the tractor 1 in front of the plow a bracket 2 is attached by screws. In the bracket 2 two vertical bolts 3 are rigidly fixed serving as a guide for a carrier 5. The latter is slidably mounted on said bolts 3, it may be adjusted in vertical direction by means of a screw-threaded spindle 4, which is provided with a hand wheel having a tapped hub, the spindle 4 being rotatably inserted into the carrier 5 without being slidable axially relatively to said carrier. From the carrier 5 extend two arms 6 in horizontal direction. In the ends of the arms 6 two horizontal bolts 8 are arranged on which a casing 7 is pivotally mounted (Figs. 1 to 3). In the carrier 5 a horizontal shaft 11 is arranged on which a two-armed lever 10, 12 is rockingly mounted. The arm 10 is connected with a lug of the casing 7 by a link 9, while the arm 12 is connected by another link to an arm of a hand lever 13. The latter is fulcrumed on a bolt of the tractor frame and its free upper end is within the reach of the driver of the tractor. The lever 13 and therewith the casing 7 may be locked in the desired position by a rod 14 engaging a toothed segment 15 of the tractor frame. This locking means is well known per se. The casing 7, extending at a right angle to the direction of travel of the tractor 1, is provided at its free outer end with a supporting roller 16. In the casing 7 two spaced parallel guide bars 18 are fixedly mounted (Fig. 3). On the said bars 18 run three carriages 20 carrying on a ledge 20' the teeth 21 which have to break the clods 39 (Fig. 10). Each carriage 20 is provided with two sets of three rollers 19 engaging three sides of the bars 18 which are square in cross-section. The ledge 20' interconnecting the carriages 20 is connected by a rod 23 (Fig. 2) with the crank pin 24 of a gear which is positively driven by the engine of the motor tractor by means of a suitable gearing. The teeth 21 are quickly reciprocated a distance of about three inches. A great strain is put on the teeth 21 by breaking the clods. To prevent distortions and breakage, each tooth 21 is resiliently attached to the ledge 20' (Figs. 4, 5 and 6). The teeth 21 are arranged in a row equally spaced from each other. The upper end 30 of each tooth is of triangular cross-section and engages a vertical groove 26 in the ledge 20'. The groove 26 is of triangular cross-section, to receive accurately the upper end 30 of the tooth 21. Each tooth 21 carries a bolt 27 passing through a bore 29 in the ledge 20'. Between a nut on the bolt 27 and the ledge 20' a coiled spring 28 is arranged. The spring 28 has the tendency to keep the tooth 21, 30 in full engagement with the groove 26. If the strain on a tooth 21 exceeds the retaining power of the spring 28 the tooth yields and may assume positions as shown in broken lines in Figs. 4 and 5. The teeth 21 are automatically returned by the spring 28 on to their seats in the groove 26. To reduce the strain on the tooth the cross-section thereof is made triangular. The strain exerted on the ledge 20' is taken up by the bars 18. The depth to which the teeth 21 engage the soil may be varied by adjusting the position of casing 7 by the screw threaded spindle 4. The implement may be used to plant potatoes, for instance. To set the potatoes a shallow furrow is necessary to receive the seed. To produce the furrow a plow 33 with shares 34 is adjustably connected by a bar 35 to the casing 7. The shares 34 throw the soil to both sides, the potato is inserted by hand and then is covered in by some suitable tool.

In Fig. 10 the manner of working is illustrated. After two or more furrows 39 have been produced by the plow 38, the casing 7 is lowered and the harrow is thus brought into operation. The teeth 21 break the clods 39 leaving the soil ready for the planting. The harrow will be brought in action each time the plow 38 has produced two furrows.

In the construction shown in a diagrammatical manner in Fig. 11 the bar 41 carrying the teeth 21 is suspended by three links 42 on pivots 43 from a supporting bar 44. The bar 41 is reciprocated and the bar 44 is tilted by the same means described above with reference to casing 7.

What I claim is:

1. In combination with a tractor having a frame provided with a side member, a bracket attached to said side member, and a harrow extending laterally from said tractor and pivotally attached with one of its ends to said bracket so as to be able to be moved about a horizontal axis, said harrow being provided with a supporting roller at its other end and including a longitudinally reciprocatory bar provided with a series of spaced teeth, and means driven by said tractor and operatively connected with said bar for reciprocating the same.

2. In combination with a tractor having a frame provided with a side member, a bracket attached to said side member, and a harrow extending laterally from said tractor and pivotally attached with one of its ends to said bracket so as to be able to be moved about a horizontal axis, said harrow being provided with a supporting roller at its other end and including a longitudinally reciprocatory bar provided with a series of spaced teeth, a crank driven by said tractor, and a connecting rod connecting said crank with one end of said bar for reciprocating the latter.

3. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor and pivotally attached with one of its ends to said carrier so as to be movable about a horizontal axis, said harrow being provided with a supporting roller at its other end and including a longitudinally reciprocatory bar provided with a series of spaced teeth, and means driven by said tractor and operatively connected with said bar for reciprocating the same.

4. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor and pivotally attached with one of its ends to said carrier so as to be movable about a horizontal axis, manually operable means on said tractor for swinging said harrow about said horizontal pivot axis and locking it in the desired position, said harrow being provided with a supporting roller at its other end and including a longitudinally reciprocatory bar provided with a series of spaced teeth, and means driven by said tractor and operatively connected with said bar for reciprocating the same.

5. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor and pivotally attached with one of its ends to said carrier so as to be movable about a horizontal axis, manually operable means on said tractor for swinging said harrow about said horizontal pivot axis and locking it in the desired position, said harrow being provided with a supporting roller at its other end and including a reciprocatory bar provided with a series of spaced teeth, a crank driven by said tractor, and a connecting rod connecting said crank with one end of said bar for reciprocating the latter.

6. In combination with a tractor having a frame provided with a side member, a bracket attached to said side member, and a harrow extending laterally from said tractor and pivotally attached with one of its ends to said bracket so as to be able to be moved about a horizontal axis, said harrow including an elongated housing, one end of which is pivotally attached to said bracket and the other end of which has a supporting roller attached thereto, two spaced parallel guide rods within said housing, carriages slidably mounted on said guide rods and supporting a bar projecting from the lower side of said housing, a plurality of spaced teeth mounted on said bar, and means driven by said tractor and operatively connected with said bar for reciprocating the same longitudinally of the housing.

7. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor, said harrow including an elongated housing, one end of which is pivotally attached to said carrier to be movable about a horizontal axis and the other end has a supporting roller attached thereto, means forming two spaced parallel guide ways within said housing, a bar arranged parallel to said guide ways and projecting from the lower portion of said housing, carriages on said bar and slidably secured to said parallel guide ways, teeth on said bar and extending downwardly therefrom, and means driven by said tractor and operatively connected with said bar for reciprocating the same longitudinally.

8. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor, said harrow including an elongated housing, one end of which is pivotally attached to said carrier to be movable about a horizontal axis and the other end has a supporting roller attached thereto, means forming two spaced parallel guide ways within said housing, a bar arranged parallel to said guide ways and projecting from the lower portion of said housing, carriages on said bar and slidably secured to said parallel guide ways, teeth on said bar and extending downwardly therefrom, a crank driven by said tractor, and a connecting rod connecting said crank with one end of said bar for reciprocating the same longitudinally.

9. In combination with a tractor having a frame provided with a side member, means forming a vertical guide attached on said side member, a carrier slidably mounted on said vertical guide, manually operable means for adjusting said carrier in vertical direction along said guide, and a harrow extending laterally from said tractor, said harrow including a housing, one end of which is pivotally attached to said carrier to be movable about a horizontal axis and the other end has a supporting roller attached thereto, means forming two spaced parallel guide ways within said housing, a bar arranged parallel to said guide ways and projecting from the lower portion of said housing, carriages on said bar and slidably secured to said parallel guide ways, said bar having a series of transverse grooves therein, a series of teeth, each being mounted yieldingly with their upper end in one of said grooves and extend downwardly from said bar, and means driven by said tractor and operatively connected with said bar for reciprocating the same longitudinally.

ERNST HÜRLIMANN.